United States Patent [19]

Lin

[11] Patent Number: 5,220,464
[45] Date of Patent: Jun. 15, 1993

[54] COLOR FILTER ASSEMBLY DRIVER FOR SCANNERS

[76] Inventor: Bob Lin, No. 9, Lane 102, San Ming Rd., Taipei, Taiwan

[21] Appl. No.: 886,947

[22] Filed: May 22, 1992

[51] Int. Cl.⁵ ............................................. G02B 5/22
[52] U.S. Cl. .................................. 359/885; 359/889; 356/418
[58] Field of Search ............... 359/885, 890, 889, 892; 358/148, 150, 160; 356/138, 229, 418

[56] References Cited

U.S. PATENT DOCUMENTS 3,492,478  1/1970  Smith ................................... 359/889
4,082,464  4/1978  Johnson, Jr. ......................... 350/889
4,176,916  12/1979  Carpenter ........................... 359/889

Primary Examiner—Loha Ben
Attorney, Agent, or Firm—Varndell Legal Group

[57] ABSTRACT

A color filter assembly driver using a microprocessor to control a motor drive in driving a color filter assembly through a step motor and to compare feedback signal of the color filter assembly with a synchronizing signal permitting compared result to be calculated, so as to change the exciting cycle and time of the step motor according to calculation result. The microprocessor also controls the motor drive to change the single phase or two-phase exciting mode of the step motor so that the step motor is controlled to rotate at high or low revolving speed.

3 Claims, 5 Drawing Sheets

COLOR FILTER ASSEMBLY DRIVER FOR SCANNERS

BACKGROUND OF THE INVENTION

The present invention relates to a driver for driving the color filter assembly of a scanner through synchro and in phase controls, permitting the color filter assembly to be positioned accurately.

A variety of scanners are known and widely used in reading color as well as half-tone graphic data. A color scanner generally comprises a color filter assembly driven by a driving mechanism for specifying the colors of a picture being scanned. During the process of scanning, the color filter assembly shall be rotated through synchro control as well as in phase control, so that accurate color separation can be achieved. The color filter assembly driving mechanism of a scanner according to the prior art is generally comprised of a transmission gear set coupled to the color filter assembly and driven by a DC motor. In order to achieve accurate positioning, the precision of the transmission gear set is critical, and therefore the cost of the driving mechanism becomes high. Because the color filter assembly is driven by the DC motor through the transmission gear set, the revolving speed of the DC motor is greatly reduced, and therefore a graphic matter generally has to be scanned twice. If a DC motor is used to rotate the color filter assembly of a scanner directly, synchro and in phase controls are difficult to achieve. When high speed and low speed operating modes are simultaneously provided, an expensive brake and control system shall be required. Therefore, the prior art scanners which use a DC motor and a transmission gear set to drive a color filter assembly, are generally expensive to manafacture and not satisfactory in function.

SUMMARY OF THE INVENTION

The present invention has been accomplished under the aforesaid circumstances. It is therefore an object of the present invention to provide a color filter assembly driver which is simple in structure and inexpensive to manufacture. It is another object of the present invention to provide a color filter assembly driver which can effectively achieve synchro and in phase controls. These objects are achieved by using a microprocessor to control a motor drive in driving a color filter assembly through a permanent magnet type step motor. The microprocessor simultaneously receives a synchronizing signal from the scanner and a position pulse signal from the color filter assembly. The position pulse signal is compared with the synchronizing signal, and then calculated. The calculation result causes the microprocessor to provide an output signal to the motor drive, so that the step motor is controlled to rotate the color filter assembly synchronously. By changing two-phase exciting mode to single phase exciting mode, the color filter assembly is rotated by the step motor doublequick, and therefore scanning operation can be achieved through one cycle.

DETAILED DESCRIPTION OF THE PREFERRED EMBODIMENT

Figure 1:
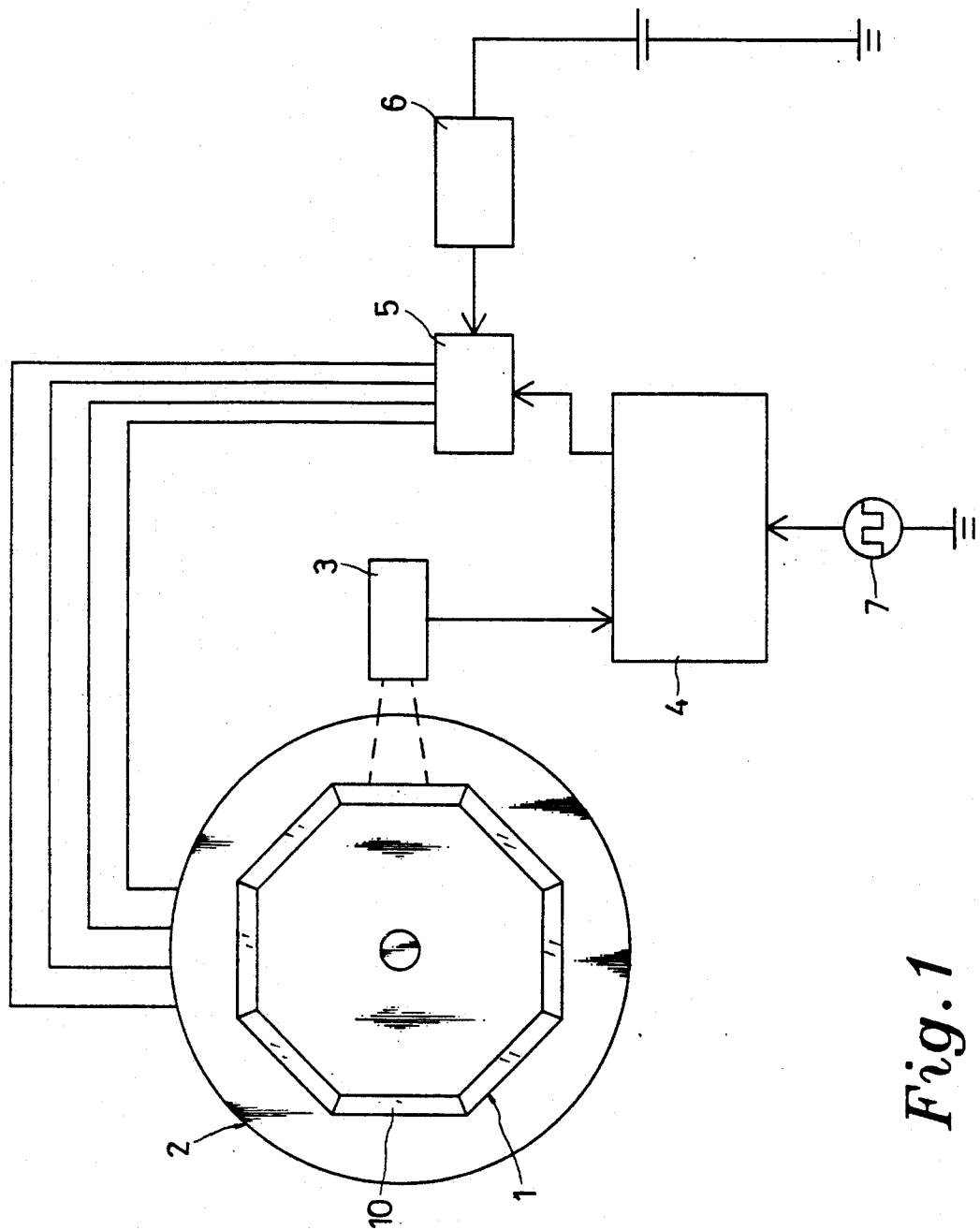
FIG. 1 is a block diagram illustrating the hardware arrangement of the preferred embodiment of the color filter assembly driver of the present invention.

Referring to FIG. 1, the present invention is generally comprised of a color filter assembly 1, a permanent magnet type step motor (PM type step motor) 2, a position detector 3, a microprocessor 4, a motor drive 5, and a current limiter 6. The color filter assembly 1 is comprised of a variety of color filters 10 for specifying the colors of a picture scanned by a scanner. The main feature of the present invention is to use the step motor 2 in driving the color filter assembly 1, so as to achieve synchro control and in phase control.

As illustrated in FIG. 1, the position detector 3 which is a photoelectric element is disposed at a suitable location adjacent to the color filter assembly 1 and controlled to detect the rotary motion of the color filter assembly 1. When either color filter 10 passed through the position detector 3 during the rotary motion of the color filter assembly 1, the position detector 3 is triggered to provide the microprocessor 4 with a position pulse signal for comparison with the reference signal produced by the synchronizing signal source 7. The microprocessor 4 will then drive the motor drive (IC TD62803P) 5 to change the revolving speed and the phase angle of the step motor 2 according to the comparison result thus obtained. Since the present invention employs a constant current driving method, a current limiter 6 is necessary for controlling the supply of a constant current, and therefore the color filter assembly 1 can be controlled to rotate stably at high speed.

Figure 2:
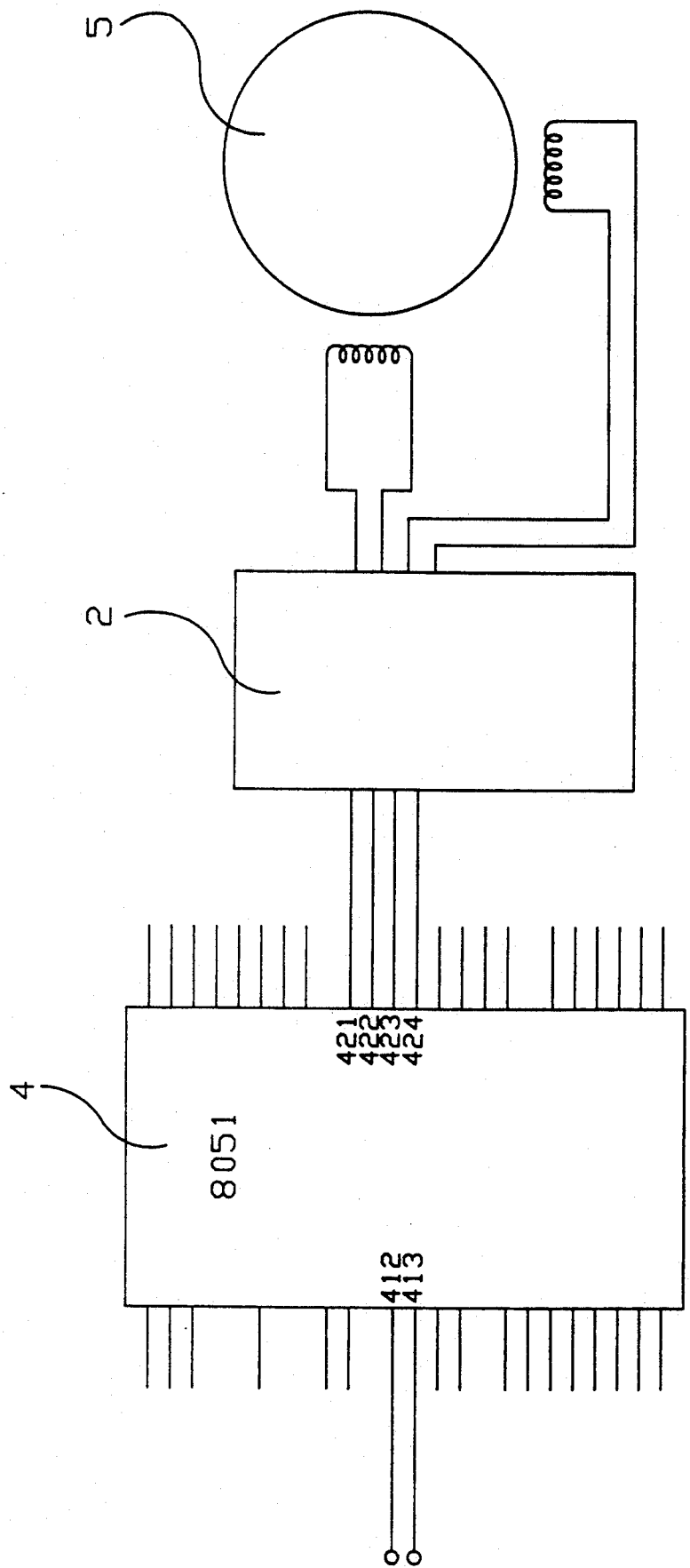
FIG. 2 is a circuit diagram of the microprocessor, the PM type step motor and the motor drive thereof.

Referring to FIG. 2, the microprocessor 4 is an 8-bit IC8051 having its 0-signal input terminal 412 connected to the position detector 3 to receive position pulse signals, and 1-signal input terminal 413 connected to the prime control circuit of the scanner, with which the present invention is used, to receive the predetermined synchronizing signal. After calculation and by means of the control of a software program, a control signal which determines the required revolving speed and phase angle is sent to the motor drive 5 through the output terminals 421, 422, 423, 424, causing it to control rotary motion of the step motor 2 accordingly. The step motor 2 is a 4-phase $(A,\bar{A},B,\bar{B})$ step motor controlled the microprocessor 4. When operated at low revolving speed, two phases are simultaneously excited each time. When operated at high revolving speed, there is only a single phase being excited each time, and at the same time, the working voltage is relatively increased. Therefore, the color filter assembly 1 can be controlled to rotate at low revolving speed as well as at high revolving speed, and image input can be achieved through one scanning procedure only.

Referring to FIGS. 5A, 5B, 6A and 6B, when a 48-step type (48 steps form a turn) 4-phase step motor is used, each color filter 10 is equally divided into 6 steps (because the color filter assembly 1 is consisted of 8 color filters), and one cycle time 71 of the synchronizing signal is equal to the running time of the step motor necessary for moving 6 steps.

Figure 3:
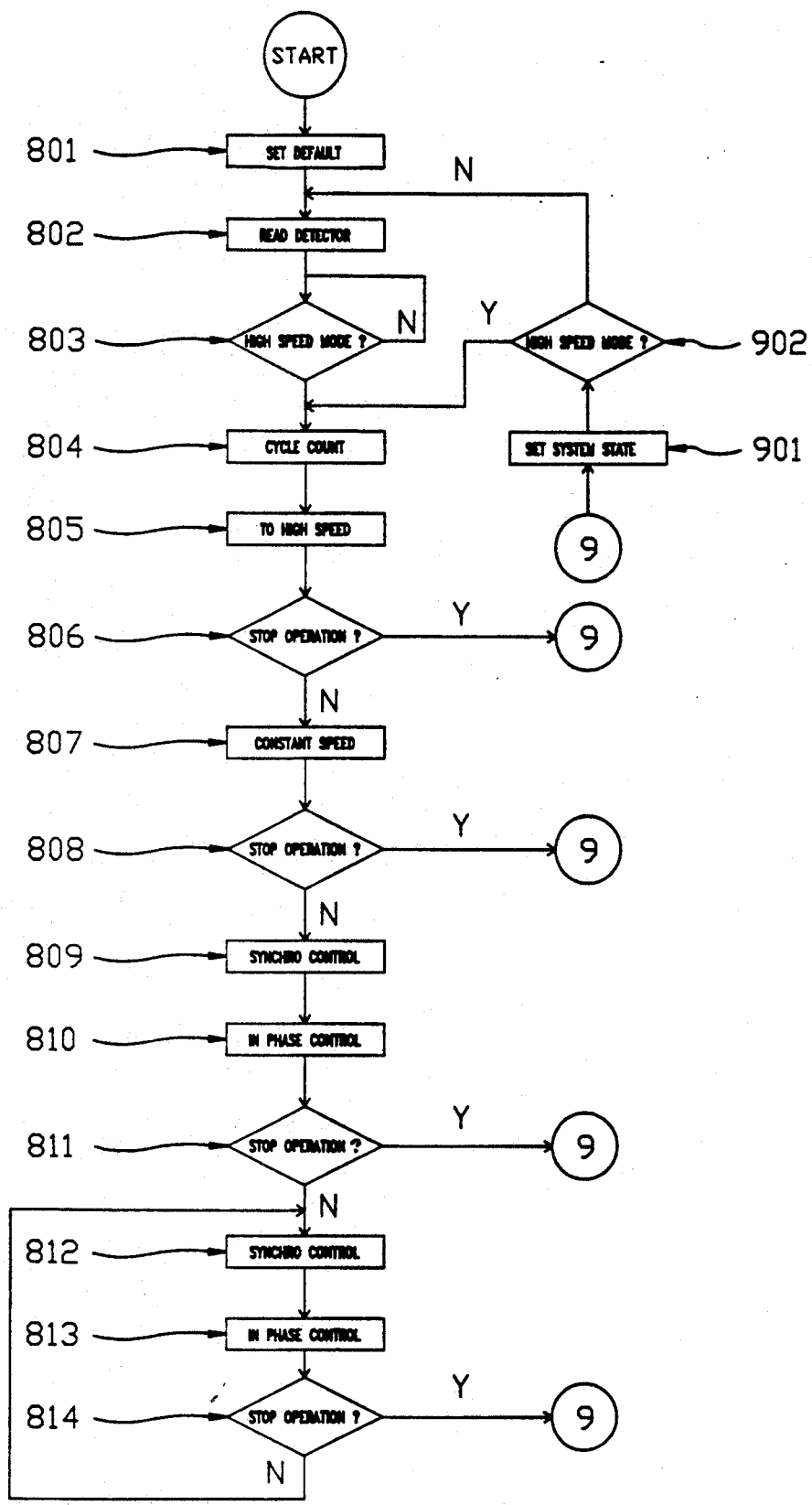
FIG. 3 is a control flow chart according to the present invention.
Figure 5:
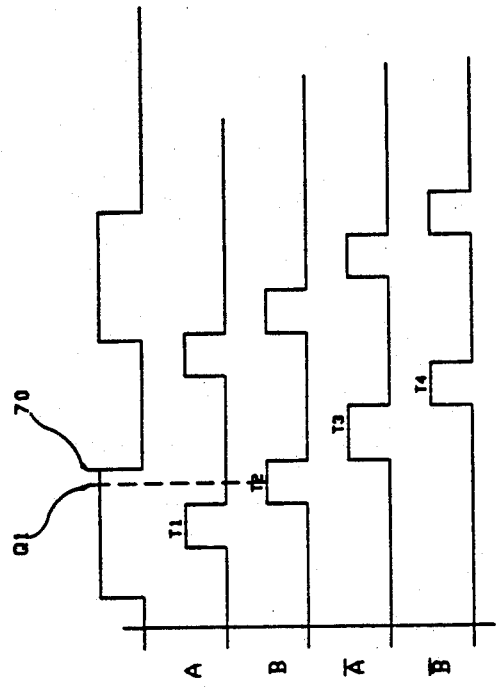
FIGS. 5A and 5B illustrate the operation of synchro control according to the present invention.
Figure 5:
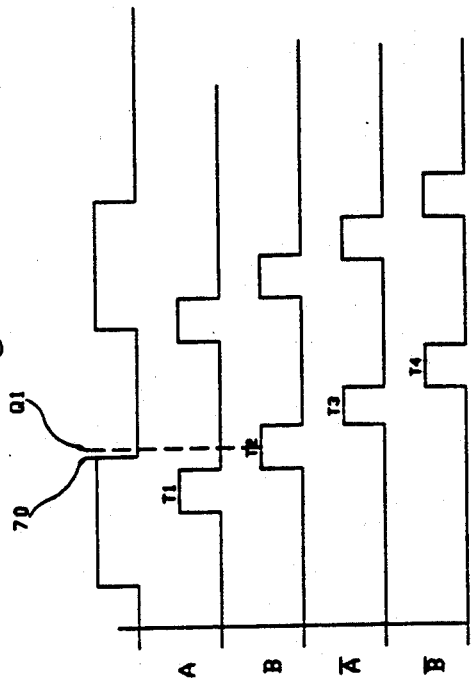
Figure 4:
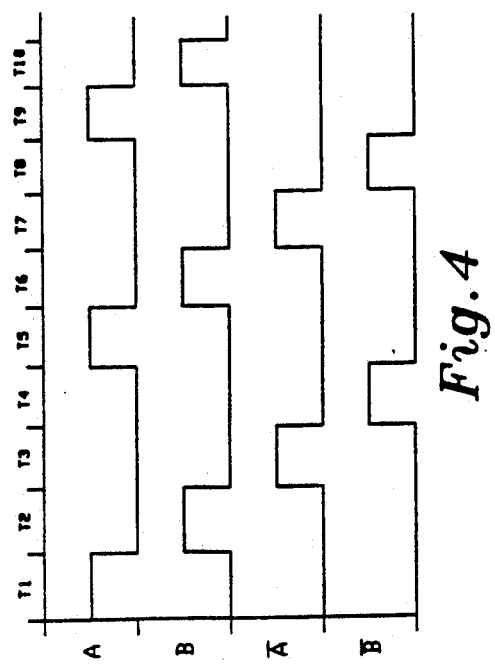
FIG. 4 is a motor excitation sequential chart according to the present invention.
Figure 6:
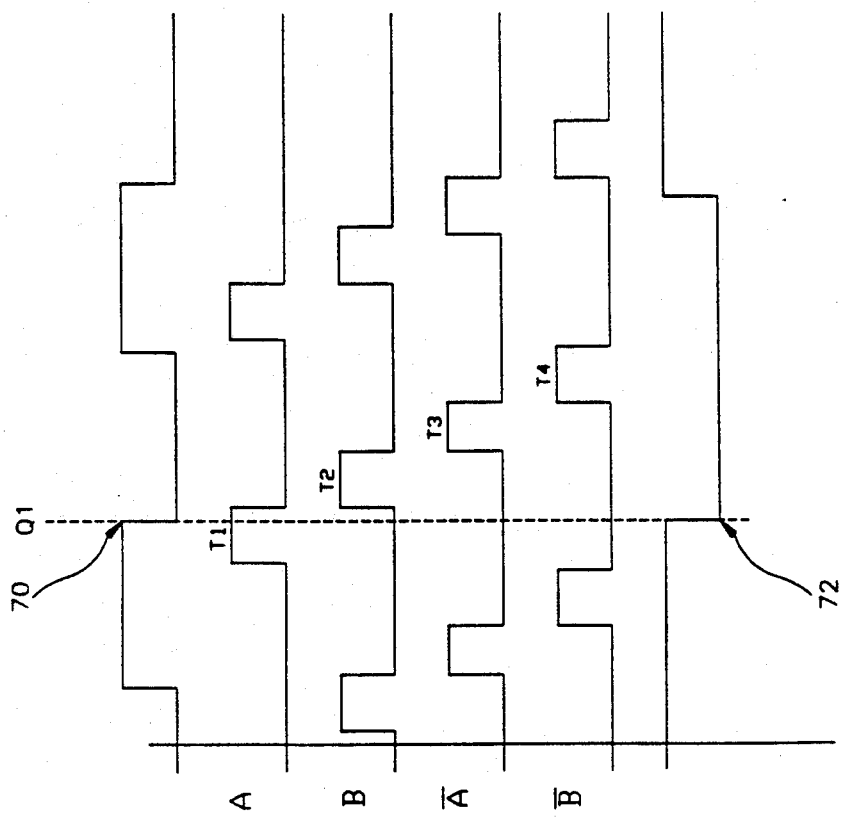
FIGS. 6A and 6B illustrate the operation of in phase control according to the present invention.
Figure 6:
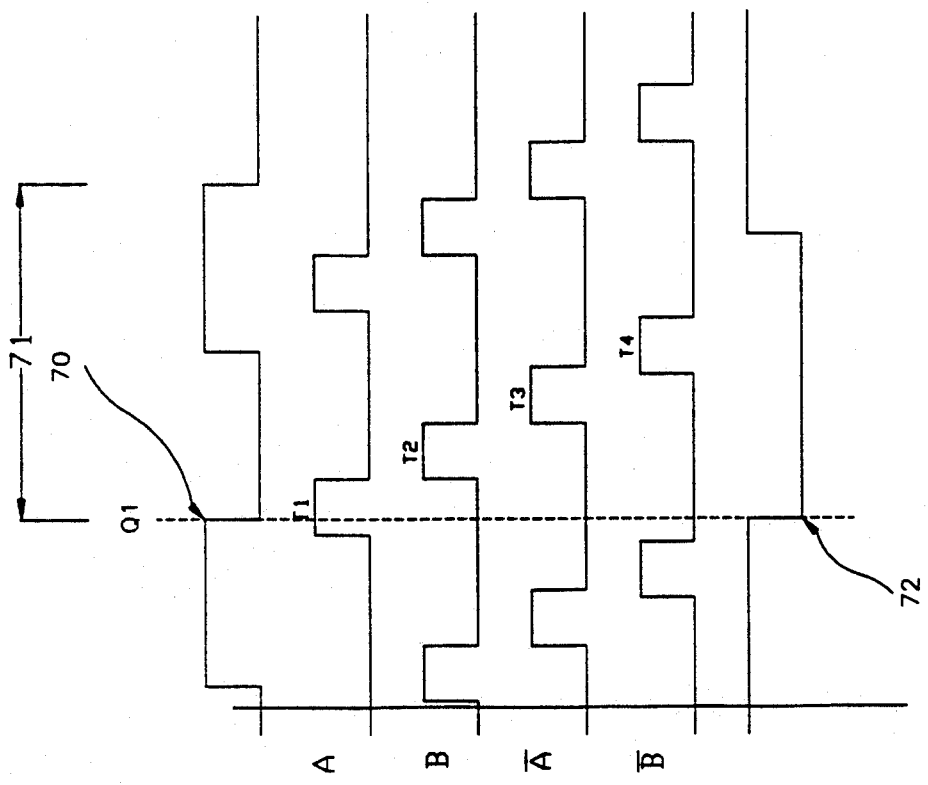

Referring to FIG. 3, therein illustrated is the control flow of the present invention. The procedure 801 is to set the default value of the system, namely, to zero every parameter value when started. The procedure 802 is to read in the input signal from the position detector for position control. The procedure 803 is to determine if high speed operation mode is required. When high speed operation mode is not required, two-phase exciting process is maintained so that the step motor keeps rotating at low revolving speed. If high speed mode is required, the procedure 804, which is to start cycle count, and the procedure 805, which is to change the revolving speed of the step motor, are processed in proper order. When the step motor 2 is to be changed from low speed operation mode to high speed operation mode, as shown in FIG. 4, two-phase exciting process is changed to single phase exciting process, and the pulse cycle of each phase of the step motor is properly adjusted from the wider cycle to the narrower cycle (T1>T2>T3 ... ). FIG. 4 illustrates the cycle change of each phase coil A,B,$\bar{A}$,$\bar{B}$ of the step motor. The procedure 806 is to judge if to stop high speed operation mode. If the answer is positive, the system jumps to a sub-program 9 so as to execute the procedure 901, which is to set the state of the system, and then the procedure 902, which is to judge if high speed operation mode is required. If high speed operation mode is required under this stage, the system jumps to the procedure 804 again, or the system will jump to the procedure 802 to read the position detector. After the procedure 806, if the answer is negative, the procedure 807 is executed so as rotate the step motor at high revolving speed constantly. After the procedure 807, the next procedure 808, which is to judge if high speed operation mode has to be stopped, is immediately executed. If the answer is positive, the system jumps to the sub-program 9 again. If high speed operation mode is not to be stopped, the procedure of synchro control 809 and the procedure of in phase control 810 are properly executed. The procedure of synchro control 809, as shown in FIGS. 5A and 5B, is to set a check point Q1 at the midpoint of the exciting signal where the synchronizing signal start point 70 is located, namely, the midpoint of the exciting cycle T2, and then to increase the cycle time of the next cycle T3 if Q1 moves leftwards from the start point 70 (namely, T1=T2<T3), or to shorten the cycle time of the next cycle T3 if Q1 moves rightwards from the start point 70 (namely, T1=T2>T3). By means of the aforesaid procedure, the step motor is controlled to rotate synchronously. Once the procedure of synchro control has been achieved, in phase control is executed. As shown in FIG. 6A, if the start point 72 of the color filter assembly that was detected by the position detector has been moved leftwards from the start point 70 of the synchronizing signal, the check point Q1 is moved to the A phase coil exciting signal of the step motor. On the contrary, as shown in FIG. 6B, if the start point 72 was shown at the right side relative to the start point 70, the check point Q1 is moved to the B phase coil exciting signal of the step motor. This arrangement is to let the exciting signal of the step motor move to the adjacent phase so as to achieve in phase control. When the procedure of in phase control 810 has been completed, the procedure 811, which is to judge if to stop the operation, is executed. If the result is negative, a last control loop, which is consisted of a procedure of synchro control 812, a procedure of in phase control 813 and a procedure of stop operation judgement 814, is executed. In the flow chart of FIG. 3, the procedure to judge if to stop operation 806,808,811,814 is repeated after the procedure to change to high speed mode 805, the procedure to rotate at constant high speed 807, the procedure of synchro control 810 and the procedure of in phase control 813. This arrangement ensures accurate operation of the step motor. The judgement is executed by the microprocessor 4 according to the scanning operation of the scanner.

As indicated, the present invention uses an inexpensive PM type step motor, a microprocessor, a position detector and a motor drive to synchronously control the rotating and positioning of a color filter assembly. By means of single phase/two-phase exciting control, low speed operation mode and high speed operation mode are alternatively set.

I claim:
1. A color filter assembly driver comprising:
    a color filter assembly formed of an octagonal cylinder having different color filters respectively arranged on the eight sides thereof;
    a step motor to rotate said color filter assembly directly;
    a position detector;
    a motor drive;
    a microprocessor, said microprocessor having a zero-signal input terminal connected to said position detector, a one-signal input terminal to receive a synchronizing signal from a synchronizing signal source, and an output port connected to said motor drive; and
    wherein said position detector is to detect the position of said color filter assembly and convert the detected signal into a position pulse signal permitting it to be sent to said microprocessor through said zero signal input terminal.
2. The color filter assembly driver according to claim 1, wherein said step motor is a permanent magnet type step motor.
3. The color filter assembly driver according to claim 1, wherein said microprocessor compares said position pulse signal with said synchronizing signal and calculates the comparison result so as to provide said motor drive with an output signal in driving said step motor to rotate.

* * * * *